United States Patent
Morita

(10) Patent No.: US 7,274,466 B2
(45) Date of Patent: Sep. 25, 2007

(54) METHOD AND APPARATUS FOR MEASURING DYNAMIC CONFIGURATION SURFACE

(75) Inventor: Nobuhiro Morita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 220 days.

(21) Appl. No.: 11/078,163

(22) Filed: Mar. 11, 2005

(65) Prior Publication Data

US 2005/0213102 A1    Sep. 29, 2005

(30) Foreign Application Priority Data

Mar. 24, 2004    (JP)    ............... 2004-088056

(51) Int. Cl.
*G01B 9/02* (2006.01)
(52) U.S. Cl. ..................................... 356/511
(58) Field of Classification Search ............... 356/28.5, 356/511–514
See application file for complete search history.

(56) References Cited

U.S. PATENT DOCUMENTS

| | | | | |
|---|---|---|---|---|
| 4,395,123 A | * | 7/1983 | Minott | ........................ 356/510 |
| 4,457,625 A | * | 7/1984 | Greenleaf et al. | .......... 356/511 |
| 7,049,578 B2 | * | 5/2006 | Wada et al. | ........... 250/231.13 |

\* cited by examiner

*Primary Examiner*—Hwa (Andrew) Lee
(74) *Attorney, Agent, or Firm*—Knoble Yoshida & Dunleavy, LLC

(57) ABSTRACT

A surface of a dynamic object such as a polygon mirror is measured to determine configuration. In measuring the surface configuration, a light is emitted onto the surface, and interference stripes are analyzed to determine the surface configuration. In analysis of the interference stripes, a correct sign for the peak frequency is required so as to measure a configuration at a high precision level without much prior preparation. The correct sign is obtained in a substantially improved manner by using a relationship between the object light that has been reflected by an object to be measured and the reference light that has been emitted from the light source.

30 Claims, 7 Drawing Sheets

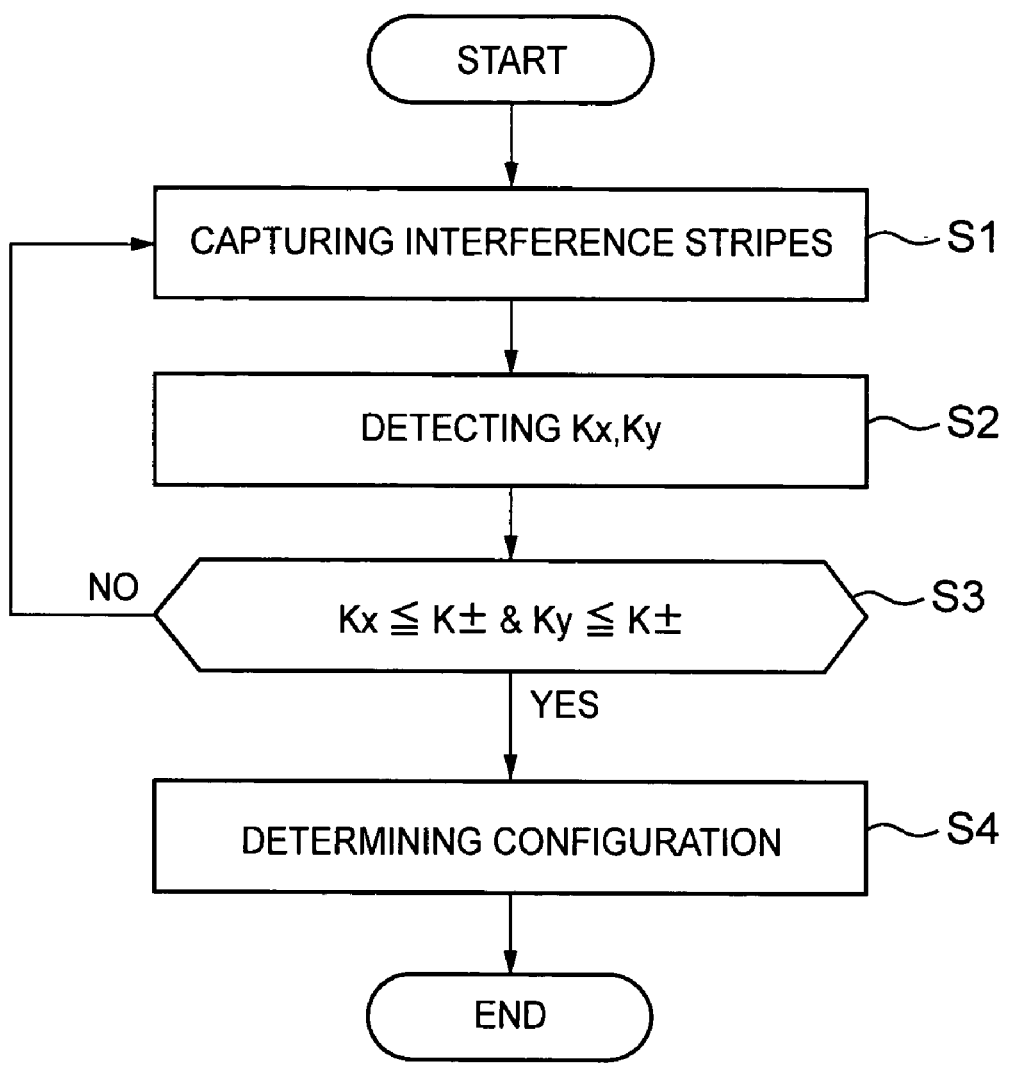

METHOD AND APPARATUS FOR MEASURING DYNAMIC CONFIGURATION SURFACE

FIELD OF THE INVENTION

The current invention is generally related to measuring configurations, and more particularly related to methods and devices of measuring configurations of dynamic or stationary objects for performance evaluations. The current invention is applicable to production techniques, applied optical measuring techniques and operational performance evaluation such as the rotational configuration of a polygon mirror.

BACKGROUND OF THE INVENTION

As shown in FIG. 1, a diagram illustrates an exemplary polygon mirror 1 that is an object to be measured according to the current invention. The polygon mirror 1 is used in image devices such as a digital copier and a laser printer for an optical writing system. The polygon mirror 1 is rotated at a high speed around a rotational axis 1b as indicated by an arrow for reflecting light beams from an optical source in order to scan the reflected beams that are reflected on a polygon mirror surface 1a. The polygon mirror surface 1a requires a highly precise configuration. A deviation from the predetermined design leads to an unexpected result in image point diameter and image position. Although the polygon mirror rotational speed depends upon a writing speed of a particular image device, recent polygon mirrors need a high rotational speed rotation for a high speed writing operation. At a high rotational speed, a deformation of the polygon mirror surface is experienced due to heat and centrifugal force. Since the reflected beam from the above deformed mirror surface fails to form an image on a predetermined position, there is a need for accurately measuring and evaluating the polygon mirror surface configuration during the high-speed rotation.

For the stationary polygon mirror surface measurement, an interferometer is used. However, since the interference fringe is not observed for the rotating polygon mirror surface, the configuration of the rotating polygon mirror surface is not measured by the interferometer. For measuring the configuration of the rotating polygon mirror surface, one prior art measuring device is disclosed in Japanese Patent 3017998. The prior art measuring device scans a laser beam onto a rotating polygon mirror surface for measuring a time difference in the reflected beams in order to detect a difference in a tilt position among the mirror surfaces. Thus, the configuration of the rotating polygon mirror surface is measured. However, since the above described prior art measuring device requires a mechanical operational part for scanning the beams, an operational mechanical error becomes a measuring error. At the same time, the measuring technique requires some time. Although the mechanical operational error is corrected by mirror reflection, additional components associated with the correction are necessary and their installment error and the subsequent positional error both contribute as additional sources of error. Furthermore, since the spatial resolution within the mirror surface depends upon the scanning beam diameter, a high resolution level is not generally expected. By reducing the beam diameter for a higher spatial resolution level, the measuring time becomes substantially longer.

Another prior art in Japanese Patent 3150239 discloses a measuring device for performing a dynamic configuration measurement at a high spatial resolution in the order of nanometer with short measurement time. The above measuring device measures a minute periodic vibration change. To accomplish the measurement, the above measuring device provides a predetermined delay between a period of an input signal into an object to be measured and another period of a signal to generate a pulse of light at a light source and measures the surface change based upon the difference between the two periods. This measuring device, however, assumes that the surface change of the object to be measured has perfect periodic vibration. Since the above described polygon mirror is mechanically rotated, it is almost impossible due to factors such as rotational eccentricity for a mirror surface to return to the exact position in the order of nanometer. That is, perfect vibration motion is difficult to achieve. Since the above measuring device measures the difference in the periods, a non-periodic portion in the object to be measured becomes a measurement error and an accurate measurement according to the above device is difficult.

Furthermore, an exemplary method in Japanese Patent 3150239 measures the surface change as a set of stationary image data by synchronizing with the signal to be given to the object to be measured to emit light from the light source. However, again, this technique makes it difficult to obtain the stationary image data since the synchronization between the light emittance and the object change is not maintained due to a non-periodic component in the movement of the object to be measured.

One method determines a surface configuration after a single interference image is recorded. In general, the method includes spatial modulation methods to determine a configuration based upon the spatial distribution of the interference stripes. For example, Fourier transformation as disclosed in "Fourier Transfer and Optical Applied Measurement," in Hikari Gizyutsu Kontakuto Vol. 36, No 2 (1998). By combining this spatial modulation method and the above described method of Japanese Patent 3150239 for synchronizing the signal to the object to be measured with the light emittance pulse signal, the dynamic configuration of an object is measured after a single interference image is recorded. Even if the movement of the object has a non-periodic component or the interference stripes are not completely stationary, as long as an image at an arbitrary timing is recorded for the interference stripes, the dynamic configuration is measured. Thus, it is possible to measure the dynamic configuration of an object such as a polygon mirror with a non-periodic movement.

Unfortunately, the above combined method has a shortcoming. When a configuration is measured by the Fourier transformation method, the peak frequency of the spatially modulated interference stripes is detected and used. For example, the peak frequency obtained by the Fourier transformation of the interference stripes takes either positive or negative numbers. The positive and negative signs of the configuration measurement values are reversed. When the signs are reversed, it becomes unclear whether the surface is convex or concave. The sign of the peak frequency is determined by a relative angle between the reflected light from the object to be measured and the reference light. For example, the peak frequency sign varies in the horizontal direction when the reference mirror is tilted to the right or the left with respect to the object mirror to be measured. By the same token, the peak frequency sign varies in the vertical direction when the reference mirror is tilted to the top or the bottom with respect to the object mirror to be measured. The above relative tilt is arbitrarily varied according to a frequency change for the interference stripe change and a setting tilt error in setting an object to be measured in a measuring device. There are some situations where the peak frequency sign cannot be determined only by the interference stripes. For the above reason, the stationary configuration of the object is previously measured by a separate measuring device and a current device. By comparing the previously measured configuration by another device and the current device, the peak frequency sign and the configuration measurement sign are confirmed and or adjusted. However, the measurement process takes longer, as described above, due to the previous stationary measurements.

Another method determines a surface configuration based upon a microscope detection technique as disclosed in "Simultaneous Amplitude-Contrast And Quantitative Phase-Contrast Microscopy By Numerical Construction of Fresnel Off-Axis Holograms," Ouyou Kougaku (Applied Optics) Vol 34, 38 (1999). The above microscopy technique measures dynamic configuration of a resonating mirror and an angle of the mirror with respect to the resonating base. In yet another method, the above measured dynamic configuration of a resonating mirror and the above measured angle of the mirror with respect to the resonating base are subject to a pulse-interference and a phase shift or a Fourier transformation. Furthermore, in a study, the interference stripes are generated on the rotating polygon mirror surface, and by detecting a change in the contrast of the interference stripes in response to a varying mirror rotational speed, the rotational speed distribution is measured for the object to be measured.

It remains desirable to provide a correct sign for the peak frequency so as to measure a configuration at a high precision level without much preparation. It also remains desirable to provide a correct sign for the configuration measurement.

SUMMARY OF THE INVENTION

In order to solve the above and other problems, according to a first aspect of the current invention, a dynamic configuration measurement device, including a pulse light source for generating pulsed light to be emitted on an optical path according to a light generating timing, an optical divider located on the optical path for dividing the pulsed light, a part of the pulsed light being divided by the optical divider and being projected onto a dynamic object that moves at a predetermined period, the projected light being reflected as an object light, the rest of the pulsed light being divided by the optical divider as a reference light, the object light and the reference light being interfered with each other to generate interference stripes, and a sign determination unit for analyzing the interference stripes to detect a sign of a peak frequency in a power spectrum of the interference stripes according to a sign determination timing.

According to the second aspect of the current invention, a dynamic configuration measurement device, including a light source for generating light to be emitted on an optical path, an optical divider located on the optical path for dividing the pulsed light, a part of the pulsed light being divided by the optical divider and being projected onto a dynamic object in movement, the projected light being reflected as an object light, the rest of the pulsed light being divided by the optical divider as a reference light, the object light and the reference light being interfered with each other to generate interference stripes, an interference stripe receiving unit for receiving the interference stripes for a sufficiently short period of time relative to the movement of the dynamic object, and a sign determination unit for analyzing the interference stripes to detect a sign of a peak frequency in a power spectrum of the interference stripes according to a sign determination timing.

According to the third aspect of the current invention, a dynamic configuration measurement device, including a light source for generating light to be emitted on an optical path, an optical divider located on the optical path for dividing the pulsed light, a part of the pulsed light being divided by the optical divider and being projected onto a dynamic object in movement, the projected light being reflected as an object light, the rest of the pulsed light being divided by the optical divider as a reference light, the object light and the reference light being interfered with each other to generate interference stripes, and a sign determination unit for analyzing the interference stripes to detect a sign of a peak frequency in a power spectrum of the interference stripes according to a sign determination timing.

According to the fourth aspect of the current invention, a method of measuring a dynamic configuration of an object, including the steps of generating pulsed light having a short interference distance to be emitted on an optical path, dividing the pulsed light, a part of the pulsed light being divided to be projected onto a dynamic object, the projected light being reflected as an object light, the rest of the pulsed light being divided as a reference light, obtaining interference stripes that has been generated by interfering the object light and the reference light, determining a sign of a peak frequency in a power spectrum of the interference stripes according to a sign determination timing; determining a position of an optical axis of the object light based upon an amplitude spectrum of the interference stripes; and displaying the position on the optical axis of the object on a display unit.

According to the fifth aspect of the current invention, a dynamic configuration measurement device, including: a light source for generating light to be emitted on an optical path according to a light generating timing; an optical divider located on the optical path for dividing the light, a part of the light being divided by the optical divider and being projected onto a dynamic object, the projected light being reflected as an object light, the rest of the light being divided by the optical divider as a reference light without being reflected by the dynamic object, the object light and the reference light being interfered with each other to generate interference stripes; and a sign determination unit for receiving and analyzing the interference stripes to determine a sign of a peak frequency in a spectrum of the interference stripes based upon a predetermined relation according to the object light and the reference light.

According to the sixth aspect of the current invention, a method of determining dynamic configuration, including the steps of emitting light on an optical path according to a light generating timing; dividing the light at least into two, a part of the light being projected onto a dynamic object, the projected light being reflected as an object light, the rest of the light being without reflected by the dynamic object as a reference light; interfering the object light and the reference light with each other to generate interference stripes; analyzing the interference stripes; and determining a sign of a peak frequency in a spectrum of the interference stripes based upon a predetermined relation according to the object light and the reference light.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 13 is a flow chart illustrating steps involved in a preferred process of measuring a dynamic object according to the current invention.

DETAILED DESCRIPTION OF THE PREFERRED EMBODIMENT(S)

Based upon incorporation by external reference, the current application incorporates all disclosures in the corresponding foreign priority document from which the current application claims priority.

Figure 1:
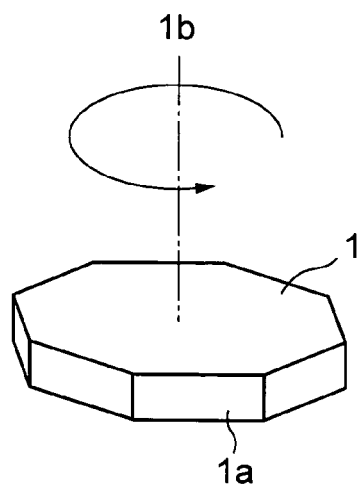
FIG. 1 is a diagram illustrating an exemplary polygon mirror 1 that is an object to be measured according to the current invention.
Figure 2:
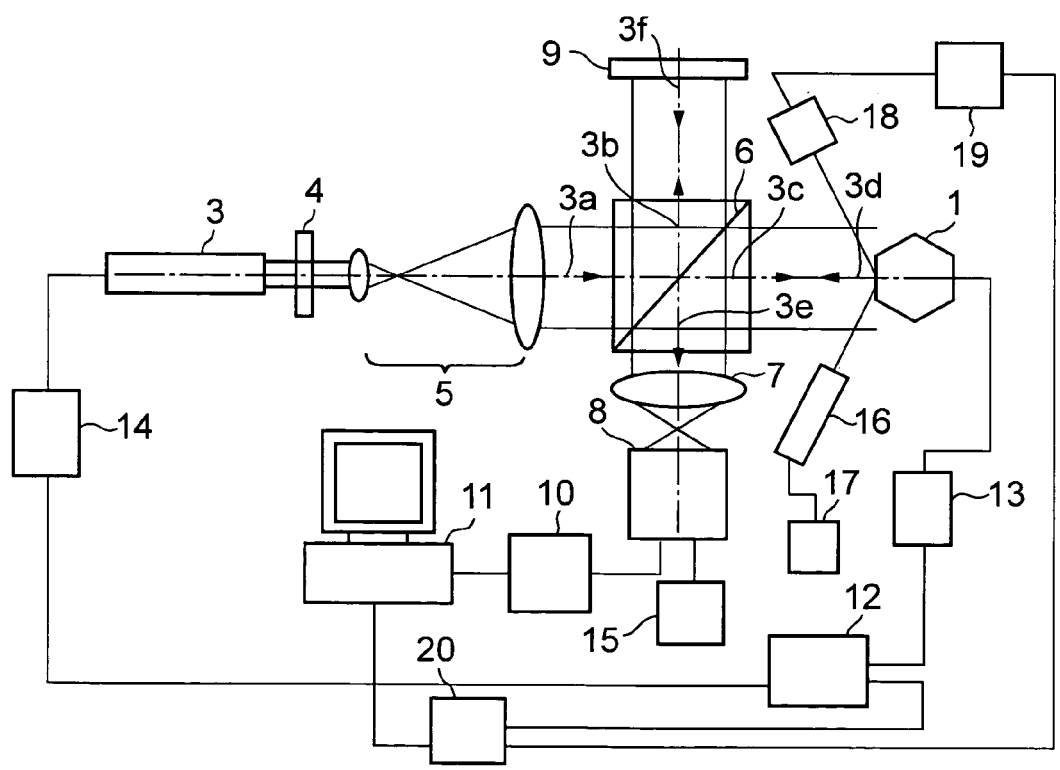
FIG. 2 is a diagram illustrating a first preferred embodiment of a dynamic configuration measuring device according to the current invention.

Referring now to the drawings, wherein like reference numerals designate corresponding structures throughout the views, and referring in particular to FIG. 2, a diagram illustrates a first preferred embodiment of a dynamic configuration measuring device according to the current invention. The first preferred embodiment includes a light source such as a laser semiconductor 3 for emitting a pulse of light with a predetermined pulse width, a ND filter 4 for adjusting the light intensity of the emitted light from the laser semiconductor 3 and a beam expander 5 for expanding the adjusted beam from the ND filter 4 to generate an expanded laser beam 3a. In further detail, the laser beam from the laser semiconductor 3 is put into parallel arrays of beams by a beam adjustment lens and a collimator lens, both of which are not illustrated in FIG. 2. A part 3c of the expanded laser beam 3a passes through a beam splitter 6 while the rest 3b is reflected by the beam splitter 6. The passing beam 3c is projected onto a polygon mirror 1, which is an object to be measured and reflects the passing beam 3c to generate a reflected beam 3d in the same pathway towards the beam splitter 6 in the reverse direction. As the laser beam 3d reaches the beam splitter 6, the laser beam 3d is reflected in a beam 3e by a back surface towards a CCD camera 8 via a lens 7. The above described reflected light beam 3d is now also referred to as an object light beam Similarly, the rest 3b of the laser beam 3a that is initially reflected by the beam splitter 6 is reflected by a mirror 9 and travels in a beam 3f towards the beam splitter 6 in the reverse direction. The laser beam 3f then passes through the beam splitter 6 in the beam 3e towards the CCD 8 via the lens 7. The reflected light beam 3f is now also referred to as a reference light beam.

Still referring to FIG. 2, some of the above described components are placed in certain distances to cause interference. The difference in optical path length between the object light beam and reference light beam is made to be less than coherence length of the laser semiconductor 3. In general, when the optical axis of the object light beam and the reference light beam is matched, the two light beams cause interference and generate interface stripes. The lens 7 is positioned at a certain distance so that an image of the object 1 forms an image on an image-capturing surface of the CCD camera 8. Thus, the interference stripes as caused by the object light beam and reference light beam are taken by the CCD camera 8, and the image is captured by a frame grabber 10 for transferring the corresponding image data to a computer 11. The transferred image data is stored a memory unit in the computer 11 and is displayed on a display unit of the computer 11. Based upon the above general interference principle, in case of an object that changes its position in a substantially parallel direction with the optical axis of the optical system as shown in FIG. 2, pulses of light are emitted towards the object to be measured at an arbitrary timing.

On the other hand, in case of an object such as a polygon mirror, the angle of a surface to be measured varies with respect to the optical axis of the optical system as the object moves. Furthermore, in case of an object with multiple surfaces to be measure, as the object rotates, the angle of a reflective surface to be measured varies with respect to time. For this reason, at an arbitrary timing, the object light beam and reference light beam fail to interfere with each other, and the interference stripe image is not observed. Thus, the timing is adjusted so that the object rotation is synchronized with the light pulse emittance. To accomplish the synchronization, a pulse modulator 12 outputs a signal to a motor driver 13 for driving the rotation of the polygon mirror 1. The pulse modulator 12 owns at least two channels and outputs a trigger signal to a semiconductor laser driver 14 for triggering light pulses via a channel other than the channel to the motor driver 13. By using the identical signal from the pulse modulator 12, the above described synchronization is maintained between the rotation of the polygon mirror 1 and the emittance of the pulse light from the semiconductor laser 3.

A measuring operation for determining the sign of a peak frequency of the interference stripes will be further described with respect to the first preferred embodiment of the dynamic configuration measuring device of FIG. 2 according to the current invention. Some of the components of the first preferred embodiment have been already described, and the description will not be reiterated here. A semiconductor laser 16 continuously emits laser onto the polygon mirror 1, and a driver 17 drives the semiconductor laser 16. A position detection element 18 receives and detects a position of the laser beam that has been reflected by the polygon mirror 1. Although FIG. 2 does not show, it is assumed that the laser beam from the semiconductor laser 16 has been put into parallel arrays of beams by a beam adjustment lens and a collimator lens. The position detection element 18 varies the output current in response to the reception position with respect to the horizontal and vertical directions. Based upon the output from the position detection element 18, the position on a detection surface of the detection element 18 is determined for the laser beam that has been emitted from the semiconductor laser 16 and reflected by the polygon mirror 1. A voltage/current converter 19 converts the current output from the position detection element 18 to a voltage level while an analogue-to-digital converter 20 further converts the analogue voltage output from the voltage/current converter 19 to a digital voltage level. The output from the position detection element 18 in thus inputted into a personal computer 11 as digital data via the above converters 19 and 20.

The polygon mirror 1 is put in a stationary state to generate the interference stripes. The optical axis of the polygon-mirror reflected light beam and the reference light beam is substantially matched until the number of the interference stripes becomes one or less in the corresponding CCD image. In this state, the position detection element 18 is placed at a certain position with respect to the polygon mirror 1 so that the output from the position detection element 18 is a predetermined value to indicate that the polygon-mirror reflected light beam is detected at a certain position on the detection surface. For example, the predetermined output value is zero in both the X and Y directions. The same trigger signal from the pulse generator 12 to the semiconductor laser driver 14 is inputted into the AD converter 20 so as to extract the position signal from the position detection element 18 only when the laser beam is emitted. The tilt angle of the polygon-mirror reflected light beam with respect to the reference light beam is known based upon the above output signal from the position detection element 18, and the sign for the peak frequencies in the interference stripes is determined according to the tilt angle. Thus, based upon the above determined sign for the peak frequencies in the interference stripes, a sign for the configuration measurement value is clarified for the dynamic configuration measurement. If a CCD camera is used as the position detection element 18, since a light spot image from the semiconductor laser 16 via the polygon mirror 1 is captured as an image, the above described effect is obtained by detecting the spot position. When the object to be measured is stationary, the light source for the measuring purpose is a CW source. In addition, a measurement is made without the above described components and operation for adjusting the timing for the light emittance or the image capture. In the above example, the object to be measure is a polygon mirror, but is not limited and includes a dynamic mirror such as a DMD or a resonance mirror.

Figure 3A:
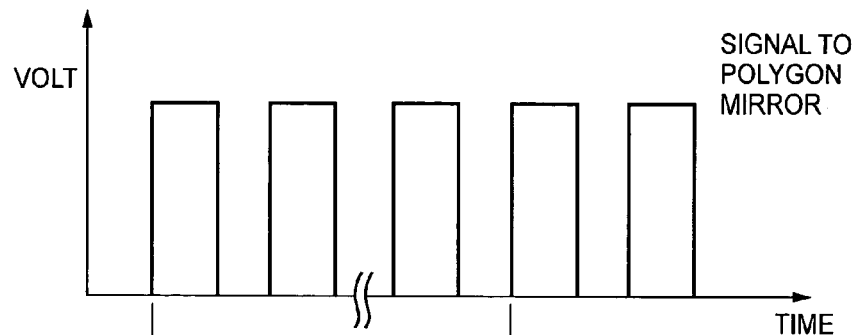
FIGS. 3A and 3B are graphs illustrating driving signals for driving the polygon mirror and emitting the laser pulse to achieve the synchronization according to the current invention.
Figure 3B:
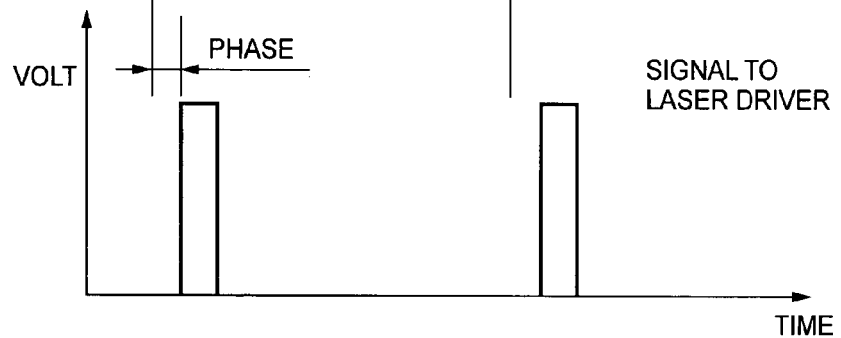

Now referring to FIGS. 3A and 3B, graphs illustrate driving signals for driving the polygon mirror and emitting the laser pulse to achieve the synchronization according to the current invention. In describing the synchronization, the first preferred embodiment as illustrated in FIG. 2 is also referred. For example, assuming the rotation of the polygon mirror 1 at 180 revolutions per minute (rpm), the pulse modulator 12 outputs predetermined timing signals to a motor driver 13 for driving the rotation of the polygon mirror 1 as shown in FIG. 3A, and the frequency for a particular surface of the polygon mirror 1 for returning to the same position is 30 hertz (Hz). For this reason, the pulse modulator 12 repeatedly outputs the semiconductor laser driver 14 the trigger signal at 30 Hz as illustrated in FIG. 3B. In order to observe the interference stripes for a specific surface of the polygon mirror 1, the phase is adjusted between the driving signals of FIG. 3A and the emittance signals of FIG. 3B. The phase adjustment operation is implemented by adjusting an adjustment knob for the phase adjustment function for the channels in the pulse modulator 12. By adjusting the inter-channel phase, an arbitrary surface of the polygon mirror 1 is substantially perpendicular with respect to the optical axis of the optical system so that the interference stripes on the polygon mirror surface are observed. To measure a particular polygon mirror surface, a physical marker is placed on the mirror surface, and the phase is adjusted until the interference stripes are observed on the marked mirror surface.

In the above case, although the emittance frequency of the semiconductor laser 3 is matched to the rotational frequency of the polygon mirror 1, the emittance frequency is alternatively set to a divisor to the rotational frequency for observing the interference stripes. If the emittance frequency of the above semiconductor laser 3 is above the frame rate of the CCD camera 8, the averaged interference image is obtained based on the quotient value in dividing the emittance frequency value by the frame rate value. Furthermore, the emittance frequency of the above semiconductor laser 3 is below the frame rate of the CCD camera 8, a CCD camera driver 15 is triggered to synchronize with the laser emittance from the semiconductor laser 3 in order to capture the image without fail. In lieu of the above synchronization between the emittance frequency of the semiconductor laser 3 and the rotational frequency of the polygon mirror 1, the same effect is alternatively achieved by the synchronization between the image capture of the CCD camera 8 and the rotation of the polygon mirror 1. Furthermore, the pulse light from the semiconductor laser 3 is generated by linearly modulation or pulse modulation. The pulse light source includes other pulse lasers such as a solid-state laser in addition to the semiconductor laser.

Figure 4:
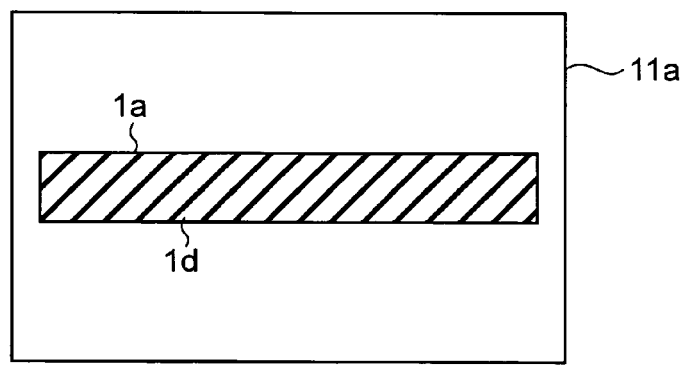
FIG. 4 is a diagram illustrating interference stripes and the polygon mirror image according to the current invention.

Now referring to FIG. 4, a diagram illustrates interference stripes and the polygon mirror image according to the current invention. The interference stripes 1*d* and the polygon mirror surface image 1*a* are exemplarily illustrated to be shown in a computer monitor screen 11*a*. The pattern and the size of the interference stripes are only illustrative and vary depending upon relevant factors. The illustrated interference stripes are assumed to be phase adjusted.

Figure 5:
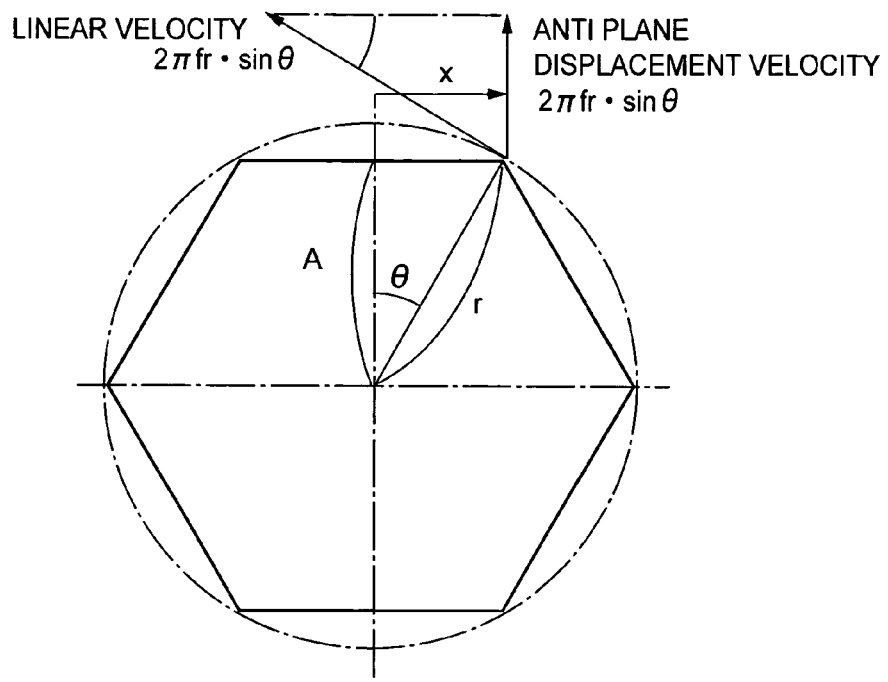
FIG. 5 is a diagram illustrating the anti-plane displacement during the rotation of an exemplary polygon mirror according to the current invention.

Now referring to FIG. 5, a diagram illustrates the anti-plane displacement during the rotation of an exemplary polygon mirror according to the current invention. Since a distance r from the rotational center of the polygon differs based upon a distance x from the center of the mirror surface, the displacement velocity v also depends upon a position in the mirror surface. The displacement velocity V is expressed by the following equation:

$$V(x) = 2\pi \pi f r \cdot \theta \quad (1)$$

where f is a rotational frequency of the polygon mirror while θ and r are defined in FIG. 5. Sufficiently high-contrasted interference stripes are observed over the entire surface of the polygon mirror if the displacement amount of the polygon mirror is less than a half of the light source frequency during the light-source pulse emittance. The number of the interference stripes such as shown in FIG. 4 becomes the least when the optical axis of the polygon-mirror reflected light beam and the reference light beam is substantially identical. In order to obtain the surface configuration of the polygon mirror from a single interference stripe image, the interference stripes are spatially modulated. That is, the optical axis of the polygon-mirror reflected light beam and the reference light beam is tilted to generate a large number of sets of the interference stripes. Based upon these sets of the interference stripes, the light and dark or light intensity distribution varies if the corresponding polygon mirror surface has irregular portions or convex/concave portions. By detecting a change in the light and dark or light intensity distribution of the interference stripes, the polygon mirror surface configuration is measured or determined. In measuring the polygon mirror surface configuration, the tilt of the polygon-mirror reflected light beam and the reference light beam with respect to a plane that is perpendicular to the rotational plane of the polygon mirror is now referred to as Y-direction. On the other hand, the tilt of the polygon-mirror reflected light beam and the reference light beam with respect to a plane that is parallel to the rotational plane of the polygon mirror is now referred to as X-direction. The X-direction tilt and Y-direction tilt are provided by adjusting the timing of the driving signal for rotating the polygon mirror and the triggering signal for emitting the semiconductor laser. As the optical axis of the polygon-mirror reflected light beam forms a larger angle with that of the reference light beam, the number of the interference stripes becomes larger.

In the calculating process for determining a configuration from the interference stripe image, the intensity distribution of the spatially modulated interference stripes is expressed in the following equation (2):

$$g(x,y)=a(x,y)+b(x,y)\cdot\cos[\Phi(x,y)] \qquad (2)$$

where x and y are coordinates on the image capturing surface of the CCD camera. g(x, y) is an interference stripe intensity distribution; a(x, y) is an interference stripe background intensity distribution while b(x, y) is an interference stripe amplitude distribution. Lastly, φ(x, y) is an interference stripe phase distribution according to the polygon mirror surface configuration. In the above equation (2), the terms, a(x, y) and b(x, y) are removed since they are unnecessary for the configuration measurement. Furthermore, the phase of the polygon mirror reflected light, φ(x, y) is extracted and converted to a configuration value to determine the surface configuration. As expressed in the following equation (3), the interference stripes having the spatial carrier frequencies $f_{x0}$ and $f_{y0}$ are obtained by interfering the polygon-mirror reflected light beam with the reference light beam at a certain tilt angle between them.

$$g(x,y)=a(x,y)+b(x,y)\cdot\cos[2\pi(f_{x0}x+f_{y0}y)\phi(x,y)] \qquad (3)$$

By performing Fourier transformation on the interference image of the equation (3) with respect to the variables x and y, a two-dimensional spatial frequency spectrum is obtained as expressed in the following equation (4).

$$G(f_x,f_y)=A(f_x,f_y)+C(f_x-f_{ox},f_y-f_{oy})+C^*(-(f_x+f_{ox}),-(f_y+f_{oy})) \qquad (4)$$

where * is a complex conjugate, $A(f_x, f_y)$ is a Fourier spectrum of a(x, y); and $C(f_x, f_y)$ is a Fourier spectrum of the complex amplitude distribution c(x, y) of the interference stripes as expressed by the following equation (5).

$$c(x, y) = \frac{1}{2}b(x, y)\exp\{i\phi(x, y)\} \qquad (5)$$

With respect to the spatial carrier frequencies $f_{x0}$ and $f_{y0}$, if the changes are moderate in the background intensity distribution a(x, y) and the complex amplitude distribution c(x, y) of the interference stripes, each of the spectra is separated by the carrier frequencies. For this reason, $C(f_x, f_y)$ is obtained by extracting only a component of the second term in the above equation (4) and moving it to the origin of the Fourier spectrum in order to remove the spatial carrier frequencies $f_{x0}$ and $f_{y0}$. The spatial carrier frequencies $f_{x0}$ and $f_{y0}$ are respectively determined from the peak frequency in the X-direction and the Y-direction after performing a Fourier transformation on the interference stripe image data. By performing a reverse Fourier transformation on the spectrum $C(f_x, f_y)$, the complex amplitude distribution c(x, y) of the Equation (5) is obtained. As expressed in the following equation (6), the phase φ(x, y) is derived by taking arctangent of a ration between an imaginary part and a real part of the above obtained complex amplitude. Finally, the surface configuration of an object to be measured is obtained by converting the phase of the equation (6) into a configuration.

$$\varphi(x, y) = \tan^{-1}\left[\frac{\text{Im}\{c(x, y)\}}{\text{Re}\{c(x, y)\}}\right] \qquad (6)$$

Figure 6:
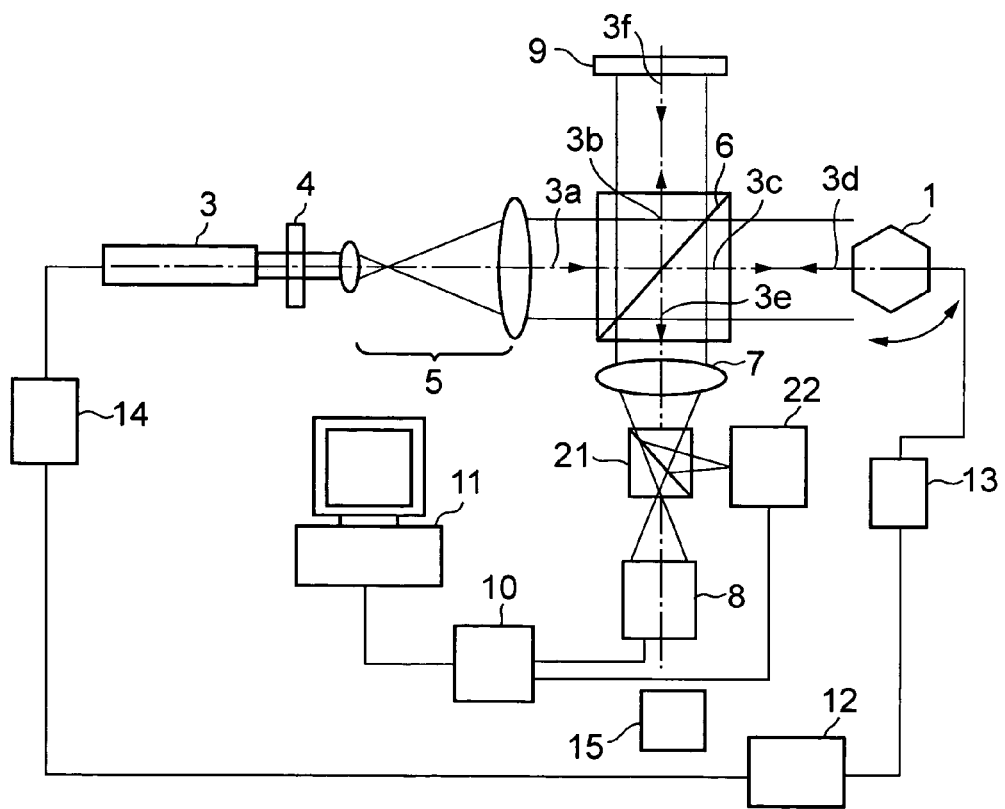
FIG. 6 is a diagram illustrating a second preferred embodiment of a dynamic configuration measuring device according to the current invention.

FIG. 6, a diagram illustrates a second preferred embodiment of a dynamic configuration measuring device according to the current invention. The second preferred embodiment includes a light source such as a laser semiconductor 3 for emitting a pulse of light with a predetermined pulse width, a ND filter 4 for adjusting the light intensity of the emitted light from the laser semiconductor 3 and a beam expander 5 for expanding the adjusted beam from the ND filter 4 to generate an expanded laser beam 3a. In further detail, the laser beam from the laser semiconductor 3 is put into parallel arrays of beams by a beam adjustment lens and a collimator lens, both of which are not illustrated in FIG. 6. A part 3c of the expanded laser beam 3a passes through a first beam splitter 6 while the rest 3b is reflected by the first beam splitter 6. The passing beam 3c is projected onto a polygon mirror 1, which is an object to be measured and reflects the passing beam 3c to generate a reflected beam 3d in the same pathway towards the first beam splitter 6 in the reverse direction. As the laser beam 3d reaches the beam splitter 6, the laser beam 3d is reflected in a beam 3e by a back surface towards a second beam splitter 21 via a lens 7.

The above described reflected light beam 3d is now also referred to as an object light beam. Similarly, the rest 3b of the laser beam 3a that is initially reflected by the beam splitter 6 is reflected by a mirror 9 and travels in a beam 3f towards the first beam splitter 6 in the reverse direction. The laser beam 3f then passes through the first beam splitter 6 in the beam 3e towards the second beam splitter 21 via the lens 7. The reflected light beam 3f is now also referred to as a reference light beam.

Still referring to FIG. 6, the second beam splitter 21 thus reflects a part of the combined beam between the reflected light beam from the polygon mirror 1 and the reflected light beam from the reference mirror 9. A CCD camera 22 is located at an approximated image forming point by the lens 7 with respect to the combined beam. The image captured by the CCD 22 is inputted into a personal computer 11 via a frame grabber 10. The spot image of the reference light beam and the reflected light beam from the polygon mirror 1 is observed. If the optical axis of the reference light beam and that of the reflected light beam from the polygon mirror 1 are substantially matched, the both spot images are also substantially overlapped in the observed image. On the other hand, If either of the optical axis of the reference light beam and that of the reflected light beam from the polygon mirror 1 is tilted with respect to the other, a spot image 23 by the polygon mirror 1 and a spot image 24 by the reference light are observed separately as illustrated in FIG. 8.

Figure 7:
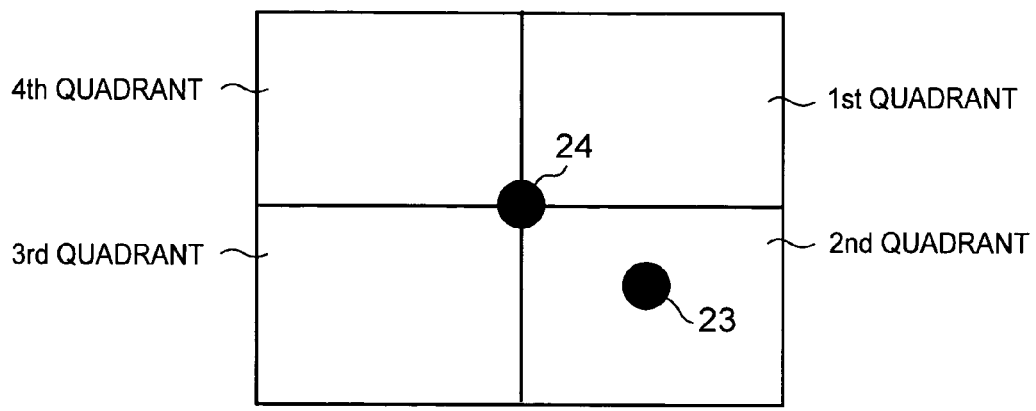
FIG. 7 is a diagram illustrating the spatial relation of the images among the first through fourth image quadrants according to the current invention.

In the initialization of the measuring device, the spot image 24 of the reference light beam is positioned at a predetermined location in the CCD 22. For example, the reference light beam is in the center of the image by adjusting the angle of the reference mirror 9, and the interference stripes are observed by placing a stationary test object of known shape in the measuring device. In measuring the configuration, since the interference stripes need to be spatially modulated, the spot image 23 from the polygon mirror 1 is isolated from the spot image 24 from the reference light beam by angling the object to be measured. As shown in FIG. 7, among the first through fourth image quadrants, for example, the object to be measured is angled to spatially modulate the interference stripes by adjusting the reflected spot image 23 to be in the second image quadrant. The measurement then takes place. In order to match the measurement results in the concave and convex configuration to those of the known configuration of the test object, the sign of the frequency of the interference stripes is determined in the X direction and the Y direction. Similarly, by changing the quadrant where the reflective spot image is observed for the object to be measured, the relationship is determined between the sign of the interference stripes in the X direction and the Y direction and each of the image quadrants. Based upon the above information, when an unknown object is measured, by detecting a quadrant of the reflective spot image of the unknown object in the CCD image, the sign of the configuration is determined. As in the case of the polygon mirror 1, since the object to be measured has large non-periodic moving components due to the rotational frequency change and the plane imperfection, the configuration sign becomes uncertain as the angle of the surface to be measured temporarily changes during the measurement. Even in these situations, the configuration sign becomes certain if the image quadrant is detected for the reflective spot image from the object to be measured during the interference stripe observation as shown in FIG. 7.

Figure 8:
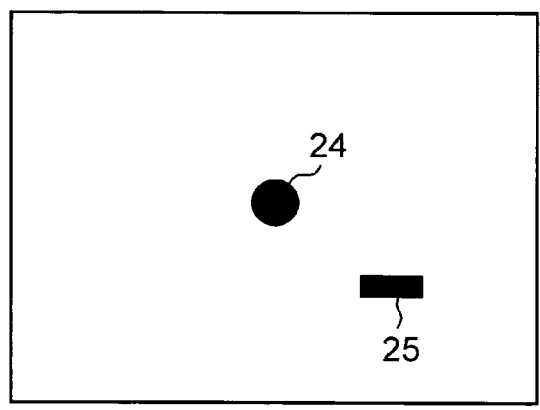
FIG. 8 is a diagram illustrating a patentable feature of a third preferred embodiment according to the current invention.

Now referring to FIG. 8, a patentable feature of a third preferred embodiment is illustrated in a diagram according to the current invention. The third preferred embodiment is substantially identical to the second preferred embodiment as illustrated in FIG. 6 except that the polygon mirror 1 and the reference mirror 9 have a different shape so that the reflected images are distinguishable. For example, the polygon mirror 1 reflects a reflected image 25 in a rectangular shape while the reference mirror 9 reflects a reflected image 24 in a circular shape as illustrated in FIG. 8. As the CCD camera 22 captures the reflected images 24 and 25, the difference in the shape is easily recognized. Since the optical axis of the reference light beam is detected by the reference mirror image position, the relative angle is determined between the polygon mirror reflected light and the reference light. Accordingly, since the sign of the peak frequency in the interference stripes is determined, the sign of the configuration measurement is ascertained by the output from the CCD camera 22 during the dynamic configuration measurement.

In the second preferred embodiment, it is difficult to distinguish the images from the reference reflected light and the object reflected light. For example, when the reflective surface of the object to be measure has a circular shape as similar to the reference mirror, the images are difficult to separate and tell which one is a reference image. To distinguish the reference image from the object reflected image, the reference mirror 9 is made into a rectangular shape. Alternatively, in stead of using a different shape, a different size in the same shape is used. For example, the reference mirror and the object mirror have a circular shape but in a different size in order to distinguish the reflected images based upon the brightness of the reflected images. By detecting the brightness, the reference and object reflected images are distinguished from each other.

Figure 9:
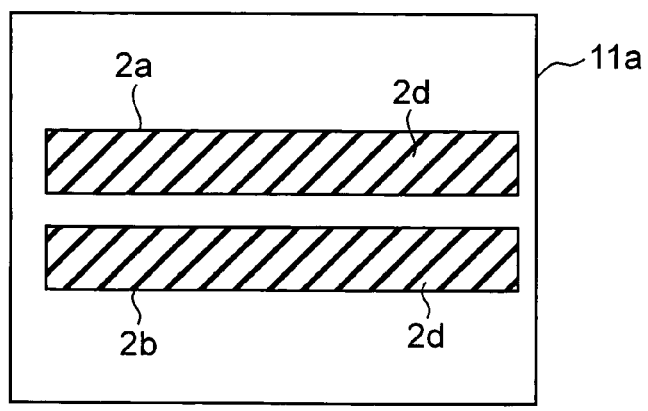
FIG. 9 is a diagram illustrating a patentable feature of a fourth preferred embodiment according to the current invention.
Figure 10:
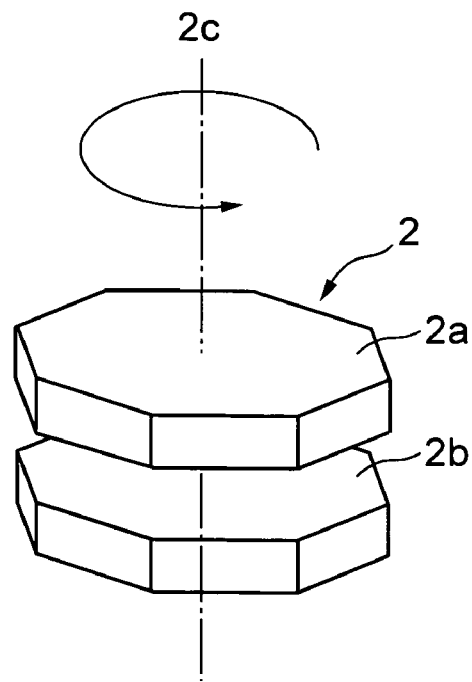
FIG. 10 is a diagram illustrating an object to be measured or a two tier polygon mirror.

Now referring to FIG. 9, a patentable feature of a fourth preferred embodiment is illustrated in a diagram according to the current invention. The fourth preferred embodiment is substantially identical to the second preferred embodiment as illustrated in FIG. 6 except for a polygon mirror 2 or an object to be measured as shown in FIG. 10. The polygon mirror 2 has a set of a first polygon mirror 2a and a second polygon mirror 2b. The height difference is caused by expansion difference. In the light source 3, the coherence length is short. When the interference stripes are obtained during a measurement of the polygon mirror 2, due to the height difference of the polygon mirrors 2a and 2b, the difference in contrast is seen in interference stripes as illustrated in FIG. 9. When the reference light beam and the object light beam best match, the contrast in the interference is the highest between the light and dark stripes. As the difference between the two light beams becomes larger, the stripe contrast becomes lower. Thus, if the relationship between the stripe contrast and the polygon mirror height is ascertained by actual measurements, the object surface height or configuration is determined by detecting the interference stripe contrast. Although the coherence length of the semiconductor laser 3 is generally short, the coherence length is several microns for super luminescence diodes. In the height measurement using the short coherence length, the short the coherence length is, the higher the resolution becomes for the height measurement due to the corresponding higher contrast.

The operation will be next described. The intensity distribution of the interference stripes is expressed by the equation (3). If the peach frequency in the interference stripes is substantially the same for the polygon mirror surfaces 2a and 2b, the Fourier spectra Ca (x, y) and Cb(x, y) in the interference stripes are determined using the same peak frequency. Based upon the above, the amplitude spectra of the interference stripes are obtained as expressed in the equation (7). The amplitude spectra Aa(x, y) and Ab(x, y) in the interference stripes are respectively determined for the polygon mirrors 2a and 2b.

$$A(x,y)=\sqrt{[Re\{c(x,y)\}]^2+[Im\{c(x,y)\}]^2} \quad (7)$$

Figure 11:
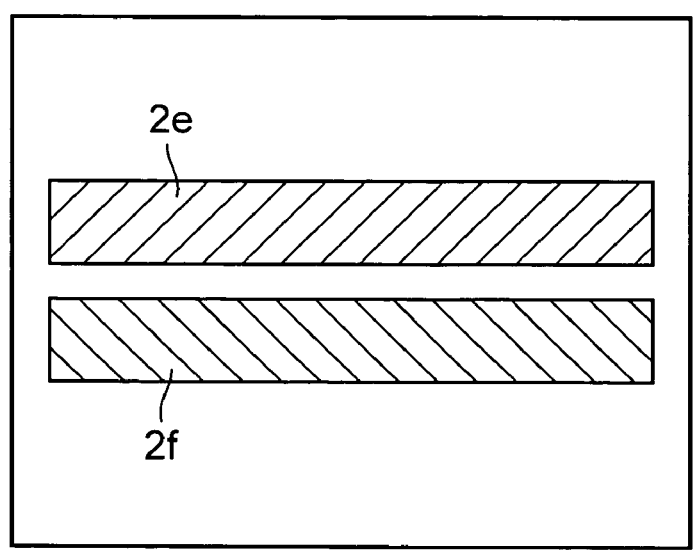
FIG. 11 is a diagram illustrating the exemplary results of the amplitude spectral distribution.

Now referring to FIG. 11, a diagram illustrates the exemplary results of the amplitude spectral distribution. The height difference between the polygon mirrors 2a and 2b is shown in the brightness difference in the amplitude spectra.

By averaging the difference of the CCD pixels for capturing the polygon mirrors 2a and 2b, the height difference between the polygon mirrors 2a and 2b. Since the above amplitude spectra are obtained with the each pixel of the CCD camera, the polygon mirror height is determined for each pixel. At each pixel for the CCD camera, the phase spectrum of the interference stripes is also obtained for determining a shape as described with respect to the first preferred embodiment. Thus, the height measurement value by the amplitude spectrum for each pixel of the CCD camera and the configuration measurement value by the phase spectrum are simultaneously obtained.

Furthermore, the above description has provided the measurement of the two polygon mirrors. The same measurement method is applicable to more than two polygon mirrors. In the operational method of the above fourth preferred embodiment, if the peak frequency in the interference stripes differs between the polygon mirrors 2a and 2b, the Fourier spectra Ca (x, y) and Cb (x, y) of the interference stripes are determined based upon the respective peak frequencies. For example, in the interference stripe image on a personal computer display, the corresponding areas for the above polygon mirrors 2a and 2b are marked by a cursor of the mouse, and the peak frequency is determined by performing the Fourier transformation separately on each of the marked areas of the CCD image. From the Fourier spectral, the amplitude spectral is obtained, and the height measured value is obtained from the amplitude spectral. Thus, even if the interference stripe peak frequency differs between the polygon mirrors 2a and 2b, a highly precise measurement is obtained.

Referring back to FIG. 12, a diagram illustrates a fifth preferred embodiment of a dynamic configuration measuring device according to the current invention. The fifth preferred embodiment includes a light source such as a laser semiconductor 3 for emitting a pulse of light with a predetermined pulse width, a ND filter 4 for adjusting the light intensity of the emitted light from the laser semiconductor 3 and a beam expander 5 for expanding the adjusted beam from the ND filter 4 to generate an expanded laser beam 3a. In further detail, the laser beam from the laser semiconductor 3 is put into parallel arrays of beams by a beam adjustment lens and a collimator lens, both of which are not illustrated in FIG. 12. A part 3c of the expanded laser beam 3a passes through a beam splitter 6 while the rest 3b is reflected by the beam splitter 6. The passing beam 3c is projected onto a polygon mirror 1, which is an object to be measured and reflects the passing beam 3c to generate a reflected beam 3d in the same pathway towards the beam splitter 6 in the reverse direction. As the laser beam 3d reaches the beam splitter 6, the laser beam 3d is reflected in a beam 3e by a back surface towards a CCD camera 8 via a lens 7. The above described reflected light beam 3d is now also referred to as an object light beam. Similarly, the rest 3b of the laser beam 3a that is initially reflected by the beam splitter 6 is reflected by a mirror 9 and travels in a beam 3f towards the beam splitter 6 in the reverse direction. The laser beam 3f then passes through the beam splitter 6 in the beam 3e towards the CCD 8 via the lens 7. The reflected light beam 3f is now also referred to as a reference light beam.

Figure 12:
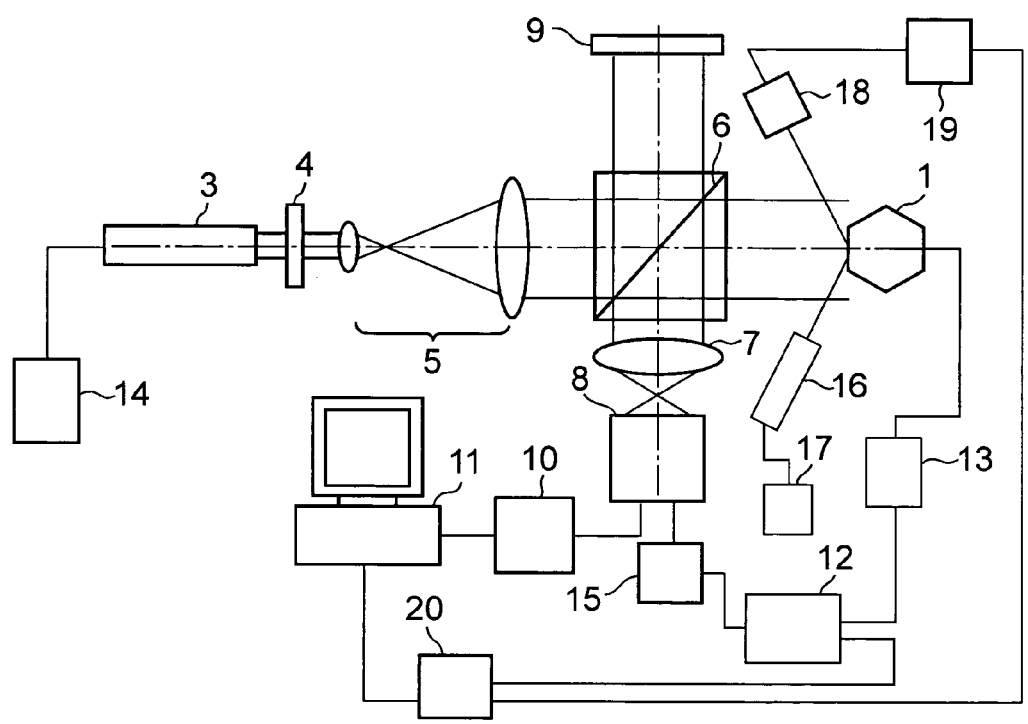
FIG. 12 is a diagram illustrating a fifth preferred embodiment of a dynamic configuration measuring device according to the current invention.

Still referring to FIG. 12, some of the above described components are placed in certain distances to cause interference. The difference in optical path length between the object light beam and reference light beam is made to be less than the lens length of the laser semiconductor 3. In general, when the optical axis of the object light beam and the reference light beam is matched, the two light beams cause interference and generate interface stripes. The lens 7 is positioned at a certain distance so that an image of the object 1 forms an image on an image-capturing surface of the CCD camera 8. Thus, the interference stripes as caused by the object light beam and reference light beam are taken by the CCD camera 8, and the image is captured by a frame grabber 10 for transferring the corresponding image data to a computer 11. The transferred image data is stored a memory unit in the computer 11 and is displayed on a display unit of the computer 11. Based upon the above general interference principle, in case of an object that changes its position in a substantially parallel direction with the optical axis of the optical system as shown in FIG. 11, pulses of light are emitted towards the object to be measured at an arbitrary timing.

In the fifth preferred embodiment, a driver 14 maintains a driving voltage at a constant level for constantly emitting the light. A pulse generator 12 generates a trigger signal and outputs to a CCD camera driver 15 so as to capture the interference stripe image at the CCD camera 8 in synchronization with the rotation of the polygon mirror 1. If the interference stripes are exposed to the light receiving surface of the CCD camera 8 for a less than half the period of the wavelength of the semiconductor laser 3, the interference stripes represents an amount of change in the polygon mirror surface in the optical axis direction of object during the rotation of the polygon mirror 1. As similar to a shorter emitting width of the semiconductor laser 3, an image of the interference stripes over the entire surface of the polygon mirror 1 is captured. By adjusting the shutter opening function of the CCD camera 8, the CCD exposure time is adjusted. With a high speed camera, a short exposure time is available, and the interference stripes are captured from a polygon mirror that rotates at a higher speed for the measurement.

Now referring to FIG. 13, a flow chart illustrates steps involved in a preferred process of measuring a dynamic object according to the current invention. In relation to the flow chart, variables Kx and Ky respectively represent a peak frequency in the x and y direction of the interference stripes while Kt represents a predetermined threshold value of the peak frequency. In a step S1, an image of the interference stripes are captured. In a step S2, Kx and Ky are determined. Subsequently, the peak frequency values Kx and Ky are each compared to the threshold value Kt in a step S3. If both of the peak frequency values Kx and Ky are equal or less than the threshold value Kt in the step S3, the configuration or height is determined in a step S4. On the other hand, either of the peak frequency values Kx and Ky is not equal or less than the threshold value Kt in the step S3, a new set of the interference stripes is sampled again in the step S1 before the step S4 takes place. The above described preferred process is performed either manually or automatically. In addition, another preferred process includes an additional step of adjusting the phase of the light source in response to the step S3 before a new set of the interference stripes is sampled.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A dynamic configuration measurement device, comprising:
   a pulse light source for generating pulsed light to be emitted on an optical path according to a light generating timing;
   an optical divider located on the optical path for dividing the pulsed light, a part of the pulsed light being divided by the optical divider and being projected onto a dynamic object that moves at a predetermined period, the projected light being reflected as an object light, the rest of the pulsed light being divided by the optical divider as a reference light, the object light and the reference light being interfered with each other to generate interference stripes; and
   a sign determination unit for analyzing the interference stripes to detect a sign of a peak frequency in a power spectrum of the interference stripes according to a sign determination timing.

2. The dynamic configuration measurement device according to claim 1 further comprising a timing adjustment unit connected to the pulse light source for adjusting the light generating timing and the sign determination unit for adjusting the sign determination timing.

3. The dynamic configuration measurement device according to claim 1 wherein the sign determination unit further comprises:
   a sign detection light source for projecting light onto the dynamic object; and
   a position detection unit for detecting a position of the light that has been reflected from the dynamic object.

4. The dynamic configuration measurement device according to claim 1 wherein the sign determination unit further comprises:
   an image forming unit for forming an object image from the object light and for forming a reference image from the reference light; and
   a position detection unit for detecting a position of the object image and the reference image.

5. The dynamic configuration measurement device according to claim 4 wherein the image forming unit further comprises an optical system for forming a first shape for the object image and a second image for the reference image.

6. The dynamic configuration measurement device according to claim 5 wherein the position detection unit further comprises an image recognition unit for distinguishing the first shape from the second shape.

7. The dynamic configuration measurement device according to claim 1 wherein the pulse light source generates the pulsed light having a short interference distance, claim 1 further comprises a position detection unit for determining a distance with respect to an optical path of the object light based upon an amplitude spectrum of the interference stripes.

8. A dynamic configuration measurement device, comprising:
   a light source for generating light to be emitted on an optical path;
   an optical divider located on the optical path for dividing the pulsed light, a part of the pulsed light being divided by the optical divider and being projected onto a dynamic object in movement, the projected light being reflected as an object light, the rest of the pulsed light being divided by the optical divider as a reference light, the object light and the reference light being interfered with each other to generate interference stripes;
   an interference stripe receiving unit for receiving the interference stripes for a sufficiently short period of time relative to the movement of the dynamic object; and
   a sign determination unit for analyzing the interference stripes to detect a sign of a peak frequency in a power spectrum of the interference stripes according to a sign determination timing.

9. A dynamic configuration measurement device, comprising:
   a light source for generating light to be emitted on an optical path;
   an optical divider located on the optical path for dividing the pulsed light, a part of the pulsed light being divided by the optical divider and being projected onto a dynamic object in movement, the projected light being reflected as an object light, the rest of the pulsed light being divided by the optical divider as a reference light, the object light and the reference light being interfered with each other to generate interference stripes; and
   a sign determination unit for analyzing the interference stripes to detect a sign of a peak frequency in a power spectrum of the interference stripes according to a sign determination timing.

10. The dynamic configuration measurement device according to claim 9 wherein the sign determination unit further comprises:
    a sign detection light source for projecting light onto the dynamic object; and
    a position detection unit for detecting a position of the light that has been reflected from the dynamic object.

11. The dynamic configuration measurement device according to claim 9 wherein the sign determination unit further comprises:
    an image forming unit for forming an object image from the object light and for forming a reference image from the reference light; and
    a position detection unit for detecting a position of the object image and the reference image.

12. The dynamic configuration measurement device according to claim 11 wherein the image forming unit further comprises an optical system for forming a first shape for the object image and a second image for the reference image.

13. The dynamic configuration measurement device according to claim 12 wherein the position detection unit further comprises an image recognition unit for distinguishing the first shape from the second shape.

14. The dynamic configuration measurement device according to claim 9 wherein the pulse light source generates the pulsed light having a short interference distance, claim 9 further comprises a position detection unit for determining a distance with respect to an optical path of the object light based upon an amplitude spectrum of the interference stripes.

15. A method of measuring a dynamic configuration of an object, comprising the steps of:
    generating pulsed light having a short interference distance to be emitted on an optical path;
    dividing the pulsed light, a part of the pulsed light being divided to be projected onto a dynamic object, the projected light being reflected as an object light, the rest of the pulsed light being divided as a reference light;
    obtaining interference stripes that has been generated by interfering the object light and the reference light;

determining a sign of a peak frequency in a power spectrum of the interference stripes according to a sign determination timing;

determining a position of an optical axis of the object light based upon an amplitude spectrum of the interference stripes; and displaying the position of the optical axis of the object on a display unit.

16. The method of measuring a dynamic configuration of an object according to claim 15 further comprising additional steps of:

dividing the interference stripes into a plurality of areas; and determining a peak frequency of the interference stripes in each of the areas; and determining the position of the dynamic object based upon the peak frequency.

17. A dynamic configuration measurement device, comprising:

a light source for generating light to be emitted on an optical path according to a light generating timing;

an optical divider located on the optical path for dividing the light, a part of the light being divided by the optical divider and being projected onto a dynamic object, the projected light being reflected as an object light, the rest of the light being divided by the optical divider as a reference light without being reflected by the dynamic object, the object light and the reference light being interfered with each other to generate interference stripes; and a sign determination unit for receiving and analyzing the interference stripes to determine a sign of a peak frequency in a spectrum of the interference stripes based upon a predetermined relation according to the object light and the reference light.

18. The dynamic configuration measurement device according to claim 17 further comprising a timing adjustment unit connected to the light source for adjusting the light generating timing and the sign determination unit for adjusting a sign determination timing.

19. The dynamic configuration measurement device according to claim 17 wherein the sign determination unit further comprises:

a sign detection light source for independently projecting second light onto the dynamic object; and a position detection unit for detecting a position of the second light that has been reflected from the dynamic object.

20. The dynamic configuration measurement device according to claim 17 wherein the sign determination unit further comprises:

an image forming unit for forming an object image from the object light and for forming a reference image from the reference light; and a position detection unit for detecting a position of the object image and the reference image.

21. The dynamic configuration measurement device according to claim 20 wherein the image forming unit further comprises an optical system for forming a first shape for the object image and a second image for the reference image, the first shape being different from the second shape.

22. The dynamic configuration measurement device according to claim 21 wherein the position detection unit further comprises an image recognition unit for distinguishing the first shape from the second shape.

23. The dynamic configuration measurement device according to claim 17 wherein the light source generates pulsed light having a short interference distance, claim 17 further comprises a position detection unit for determining a distance with respect to an optical path of the object light based upon an amplitude spectrum of the interference stripes.

24. A method of determining dynamic configuration, comprising the steps of:

emitting light on an optical path according to a light generating timing;

dividing the light at least into two, a part of the light being projected onto a dynamic object, the projected light being reflected as an object light, the rest of the light being without reflected by the dynamic object as a reference light;

interfering the object light and the reference light with each other to generate interference stripes;

analyzing the interference stripes; and determining a sign of a peak frequency in a spectrum of the interference stripes based upon a predetermined relation according to the object light and the reference light.

25. The method of determining dynamic configuration according to claim 24 further comprising additional step of adjusting the light generating timing and a sign determination timing.

26. The method of determining dynamic configuration according to claim 24 wherein the sign determination step further comprises additional steps of:

independently projecting second light onto the dynamic object; and detecting a position of the second light that has been reflected from the dynamic object.

27. The method of determining dynamic configuration according to claim 24 wherein the sign determination step further comprises additional steps of:

forming an object image from the object light;

forming a reference image from the reference light; and detecting a position of the object image and the reference image.

28. The method of determining dynamic configuration according to claim 27 wherein the object image has a first shape while the reference image has a second image, the first shape being different from the second shape.

29. The method of determining dynamic configuration according to claim 28 further comprises an additional step of automatically distinguishing the first shape from the second shape.

30. The method of determining dynamic configuration according to claim 24 wherein the emitted light is pulsed having a short interference distance, claim 24 further comprising an additional step of determining a distance with respect to an optical path of the object light based upon an amplitude spectrum of the interference stripes.

* * * * *